Sept. 15, 1964  E. D. LORD ETAL  3,148,852
SUPPORTS FOR PIPES
Filed Feb. 12, 1962
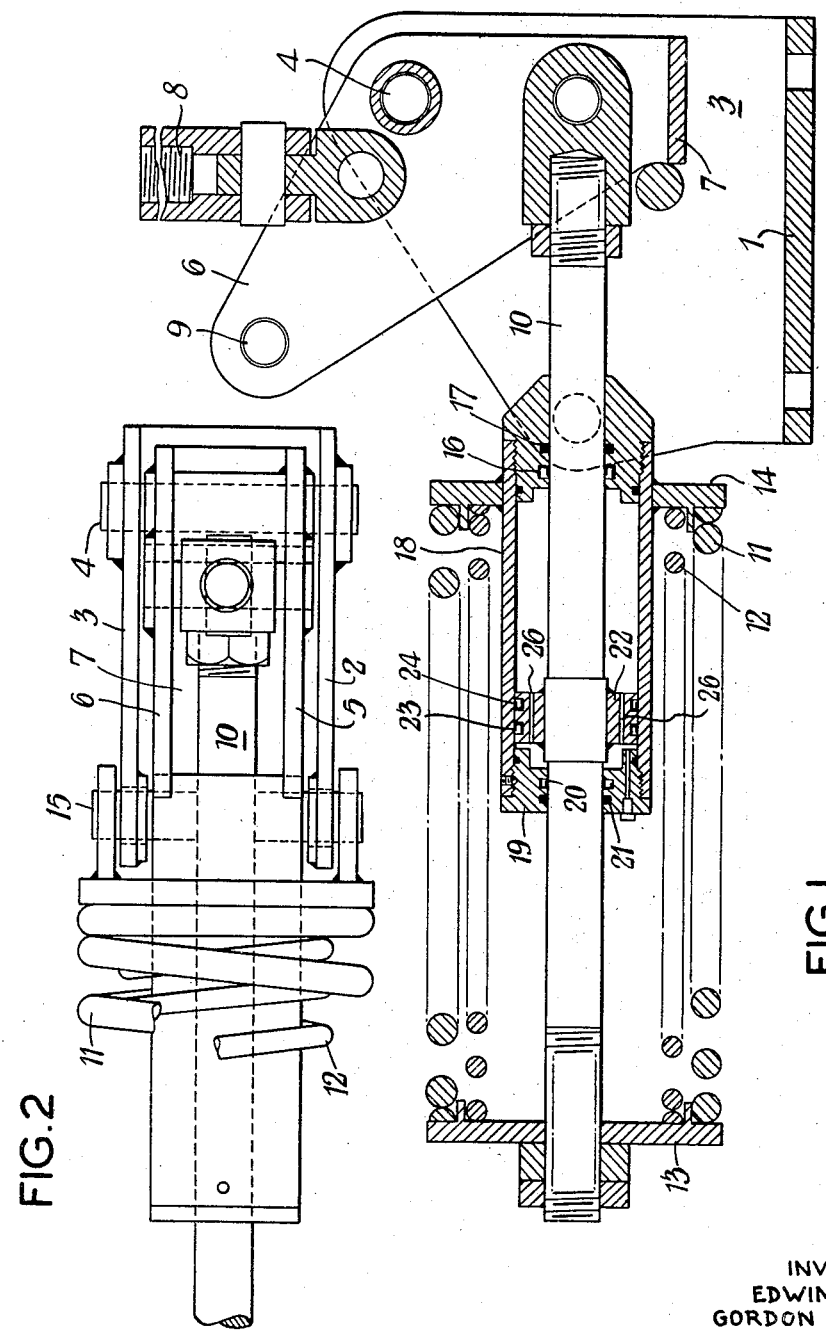
INVENTORS
EDWIN D. LORD
GORDON H. VOKES
BY  Imrie and Smiley
ATTORNEYS

United States Patent Office 3,148,852
Patented Sept. 15, 1964

3,148,852
SUPPORTS FOR PIPES
Edwin Derek Lord and Gordon Heatherton Vokes, Guildford, Surrey, England, assignors to The General Spring Corporation, New York, N.Y.
Filed Feb. 12, 1962, Ser. No. 172,714
3 Claims. (Cl. 248—54)

This invention concerns improvements in supports for pipes of the kind employing springs or other elastic members to provide a substantially constant supporting force despite distortion due to thermal expansion.

In certain cases it is necessary to provide constant support hangers for a pipe system and yet to ensure that the system shall not be damaged by sudden shock. For example, in a ship it is desirable that steam and like pipe systems should be supported in a manner giving constant support under normal conditions and giving rigidity to the systems under the shock of explosion.

According to the invention we provide a support for pipes of the kind referred to including means arranged in parallel with the spring or like elastic member, the said means permitting extension and contraction of the elastic means at a slow rate but substantially preventing movement of the elastic means upon imposition of sudden shock load.

A preferred means for controlling the movement of the elastic member of the pipe support is a piston-type dashpot including a restrictive orifice permitting only slow transfer of hydraulic fluid from one side of the piston to the other.

Another means for controlling the movement of the elastic member is constituted by at least one member subject to fluid pressure generated in an hydraulic cylinder operated by movements of the pipe support and arranged to apply a jamming, wedging or frictional force preventing movement of the support upon sudden increase in hydraulic pressure. An elastomeric ring subject to pressure in a cylinder and capable of distortion to jam a piston rod or the piston itself against movement can constitute such a member.

In one preferred form of constant support hanger a pair of compression springs one inside the other are employed to exert the required balanced support to a load frame, and in such a hanger it is convenient to house the hydraulic cylinder coaxially within the springs.

The above and other features of the invention are embodied in a constructional form of constant support which will now be described as an example with reference to the accompanying drawings in which:

FIG. 1 is a central vertical cross-section,
FIG. 2 is a plan view of the right-hand end of FIG. 1.

The support is designed to apply a constant force upwards from beneath a pipe, but it is easily adapted for inversion in which case the pipe is suspended from it.

The supporting frame has a base plate 1 from which a pair of parallel lugs 2 and 3 or side plates extend upwardly.

These side plates act as bearers for a trunnion 4 carrying a load frame made up from a pair of generally triangular spaced plates 5 and 6 joined by a web 7 at their base, so as to be generally of channel form in cross section.

The load is applied to the load frame at one or another of two chosen points 8 or 9 at the one side of the trunnion. The point 8 near the trunnion of maximum load permits only a short travel (say 2″) while the other point 9 for minimum load permits perhaps three times this travel under constant support.

A force contrary to the load is applied to the load frame below the trunnion 4 by means of a spring loaded piston rod 10, which in this particular support lies substantially horizontal.

A pair of compression springs 11 and 12 lie between an end plate 13 adjustably threaded onto the rod and an anchorage 14 pivoted to the side plates 2 and 3 of the support frame by a pin 15.

The pivoted anchorage 14 includes a gland fitted with oil seals 16 and 17 through which the rod 10 can slide freely.

A tubular extension 18 of the anchorage constitutes an hydraulic cylinder lying coaxially within the two compression springs. The end of this cylinder is closed by a cap 19 fitted with oil seals 20 and 21 through which the rod passes.

A piston 22 including sealing rings 23 and 24 is fitted to a collar 25 on the rod to operate within the cylinder, which is filled with suitable fluid.

Small orifices 26 passing through the piston permit practically free movement within the cylinder at slow speed, but act to prevent any sudden shifting of the piston and rod relative to the cylinder and thus (through the anchorage) relative to the support frame.

In operation, under normal thermal or other distortion of the supported pipe a substantially constant supporting force is applied to the pipe throughout the calculated travel by the compression springs acting upon the load frame; however, a sudden shock load tending to extend or compress the springs is virtually completely resisted by the inability of the piston to move rapidly within the cylinder which acts in effect as a retarder fitted in parallel with the springs.

In place of the construction shown it would be feasible to fit an hydraulic pressure generator between the load frame and the base plate, and a surge of pressure upon sudden relative movement could be applied to wedge members such as elastomeric rings housed in the anchorage 14 and end cap 19 to apply a jamming force to the rod 10.

It will be understood that the invention is not restricted to the details of the specific embodiment described which may be varied without departing from the scope of the following claims.

We claim:
1. In a support for pipes of the kind employing springs or other elastic members to provide a substantially constant supporting force despite distortion due to thermal expansion, the improvements comprising dash pot means and at least one elastic member connected in parallel so as to exert independent load supporting forces, said dash pot means including an hydraulic cylinder, a piston operable therein and a piston rod, the said rod passing through both end walls of the said cylinder and being so connected at opposite ends to the corresponding ends of the plastic member as to act to transfer load thereto.
2. In a support for pipes the improvements according to claim 1 wherein the elastic members comprise springs coaxially surrounding the hydraulic cylinder.

3. A device for suspending a pipe or similar item from a rigid support, comprising a chamber, a piston within said chamber, a piston rod extending in both directions from said piston through opposite end walls of said chamber, an elastic member outside said chamber, means securing one end of the plastic member to one end of said chamber and to a support element to be fixed to a rigid support, means securing the other end of the elastic member to one end of said piston rod, the other end of the piston rod having means for attachment to a pipe to be supported, and means for permitting a restricted flow of fluid within said chamber from one side of said piston to the other.

References Cited in the file of this patent
UNITED STATES PATENTS

| | | |
|---|---|---|
| 2,335,833 | Wood | Nov. 30, 1943 |
| 2,335,834 | Wood | Nov. 30, 1943 |
| 2,574,309 | Wood | Nov. 6, 1951 |